United States Patent
Utsumi et al.

(10) Patent No.: US 6,198,594 B1
(45) Date of Patent: *Mar. 6, 2001

(54) CARTRIDGE FORCED EXIT STATION FOR A LIBRARY APPARATUS

(75) Inventors: Kenichi Utsumi; Toshihito Kanetsuku, both of Kawasaki; Takahisa Miyamoto, Inagi; Hiroshi Nakazawa, Inagi; Kazuhiko Kawase, Inagi; Osamu Ohmori, Kawasaki, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/022,822

(22) Filed: Feb. 12, 1998

(30) Foreign Application Priority Data

Feb. 28, 1997 (JP) ..................................................... 9-046193

(51) Int. Cl.[7] ............................ G11B 15/68; G11B 17/04
(52) U.S. Cl. .............................................. 360/92; 369/178
(58) Field of Search ........................ 360/92, 94; 369/178, 369/36, 37, 38; 414/932

(56) References Cited

U.S. PATENT DOCUMENTS

| | | | |
|---|---|---|---|
| 4,807,066 | * | 2/1989 | Imazaike ................................. 360/92 |
| 4,907,889 | * | 3/1990 | Simone ................................... 360/92 |
| 5,128,816 | * | 7/1992 | Imazaike ................................. 360/92 |
| 5,454,485 | * | 10/1995 | Dalziel ................................... 360/92 |
| 5,539,594 | * | 7/1996 | Ito ......................................... 360/92 |
| 5,781,517 | * | 7/1998 | Nakajima ............................... 360/92 |

* cited by examiner

Primary Examiner—David Davis
(74) Attorney, Agent, or Firm—Greer, Burns & Crain, Ltd (57) ABSTRACT

A library apparatus is provided with a cartridge forced exit station for forcibly discharging a defective cartridge for safe removal by an operator. The cartridge forced exit station includes a storage rack for accepting the defective from an operating space side of a transferring mechanism in the interior of the library apparatus. The storage rack houses the defective cartridge. The storage rack is configured to selectively prevent access between a cartridge storage space in the storage rack and the operating space side.

8 Claims, 12 Drawing Sheets

CARTRIDGE FORCED EXIT STATION FOR A LIBRARY APPARATUS

The present invention relates to a library apparatus which stores a number of cartridges such as magnetic tape cartridges and optical disc cartridges, and transfers a cartridge to a drive unit through a transferring mechanism such as an accessor robot. The present invention more particularly relates to a library apparatus equipped with a cartridge forced exit station for forcibly discharging a defective cartridge from the library apparatus.

BACKGROUND OF THE INVENTION

In general, a library apparatus such as a magnetic tape library apparatus includes a storage unit for storing a plurality of cartridges each accommodating a storage medium such as magnetic tape, a drive unit for carrying out recording and reproduction of data from the storage medium in the cartridge, and an accessor robot (accessor) for transferring the cartridge between the storage unit and the drive unit.

In response to a cartridge access request from a host apparatus, the accessor moves to the storage unit, searches for a desired cartridge, grasps the cartridge using a hand mechanism, and transfers it to the drive unit. After completion of the processing, the cartridge is removed from the processing section by the hand mechanism of the accessor and conveyed to the storage unit for storage.

Figure 10:
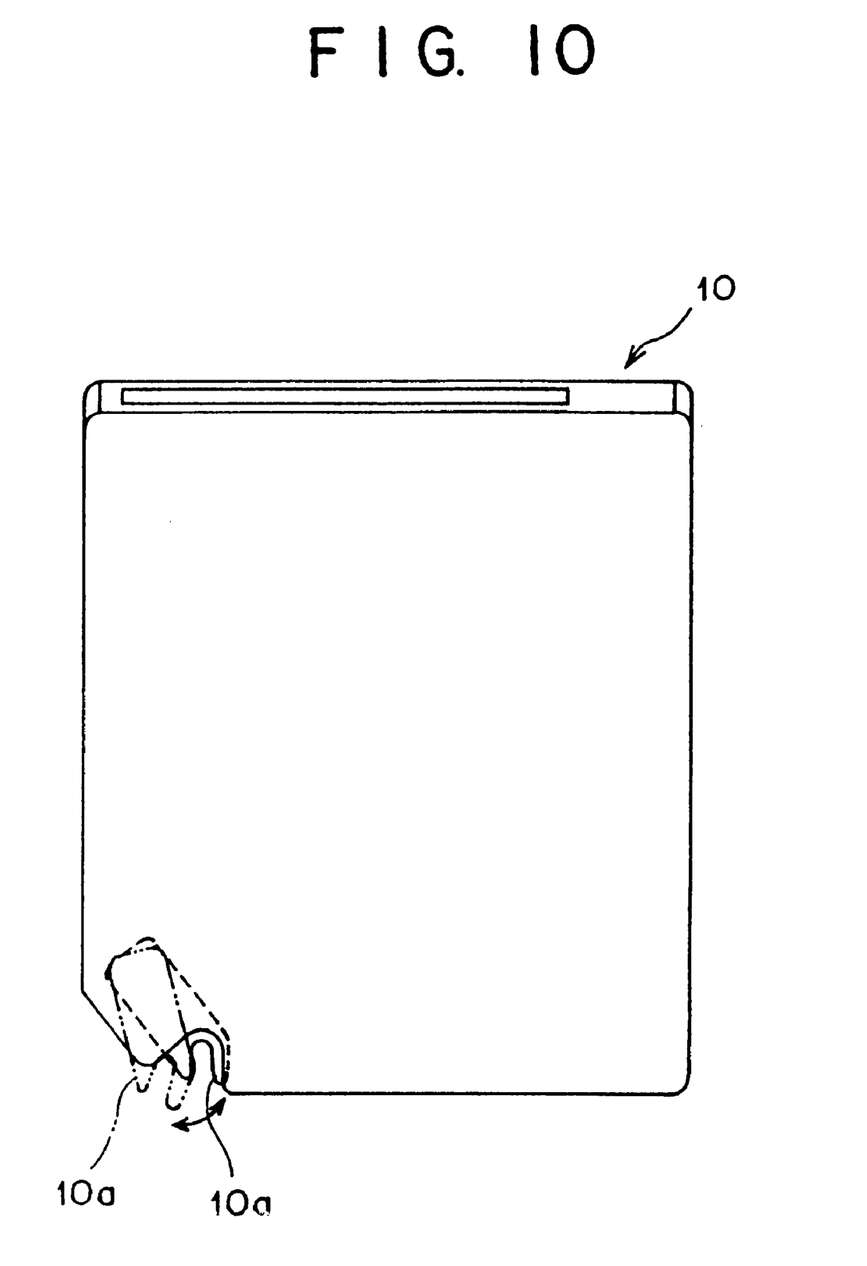
FIG. 10 is a plan view showing a magnetic tape cartridge.

The cartridge may, for example, be a magnetic tape cartridge 10 having magnetic tape as the storage medium, as shown in FIG. 10. Moreover, the tape cartridge 10 may include a leader block 10a attached to the tip portion of the magnetic tape for pulling out a magnetic tape (not shown).

A cartridge 10 (FIG. 11) is inserted/removed from a magnetic tape drive unit (MTU) 5a by a hand mechanism 7a of an accessor 7 while being guided by right and left guides 5a-1. The magnetic tape is drawn out of the cartridge 10 into the MTU 5a by the leader block 10a.

If the leader block is improperly seated within the cartridge, the library apparatus may experience difficulty in handling the cartridge and/or processing data from the cartridge. See, e.g. the two-dot chain line in FIG. 10.

Figure 12:
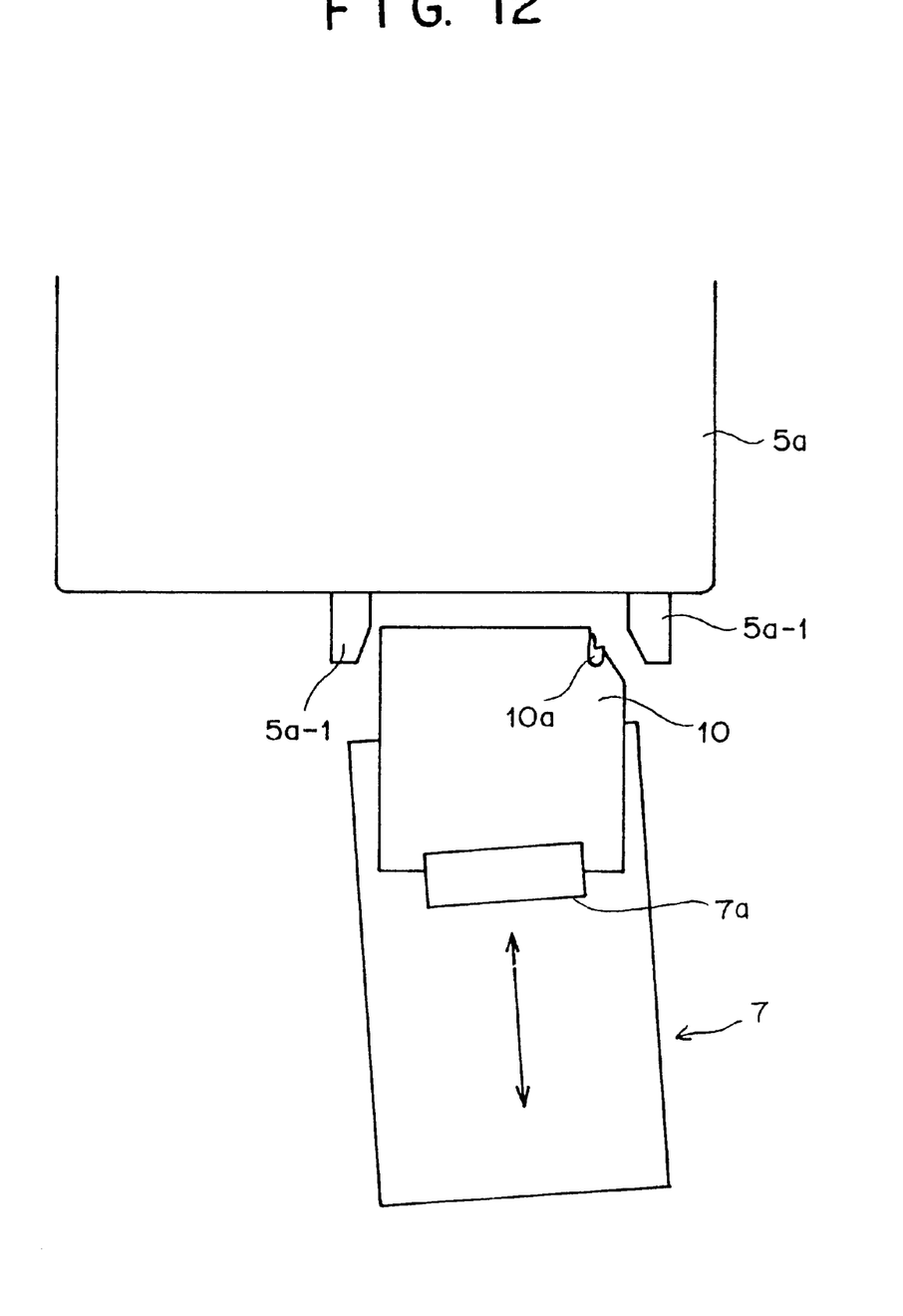
FIG. 12 is a plan view showing the state in which the hand mechanism holds a magnetic tape cartridge in an inclined condition.

By manner of illustration, FIG. 12 shows a cartridge 10 being taken out from the MTU 5a and grasped by the hand mechanism 7a. As shown, the cartridge is inclined with respect to the moving direction of the hand mechanism 7a. Notably, the inclination makes it difficult to insert the cartridge 10 into a given cell in the storage unit. Moreover, inclination of the cartridge may cause difficulty in inserting the cartridge 10 into the MTU 5a.

A cartridge which can not be handled due to an improperly seated leader block or the like is treated as a defective cartridge. In a conventional system, defective cartridges are placed by the accessor in a pocket for storage within the library apparatus. Moreover, the intervention of a skilled technician is required in order to access the defective cartridges stored within the pocket.

Figure 11:
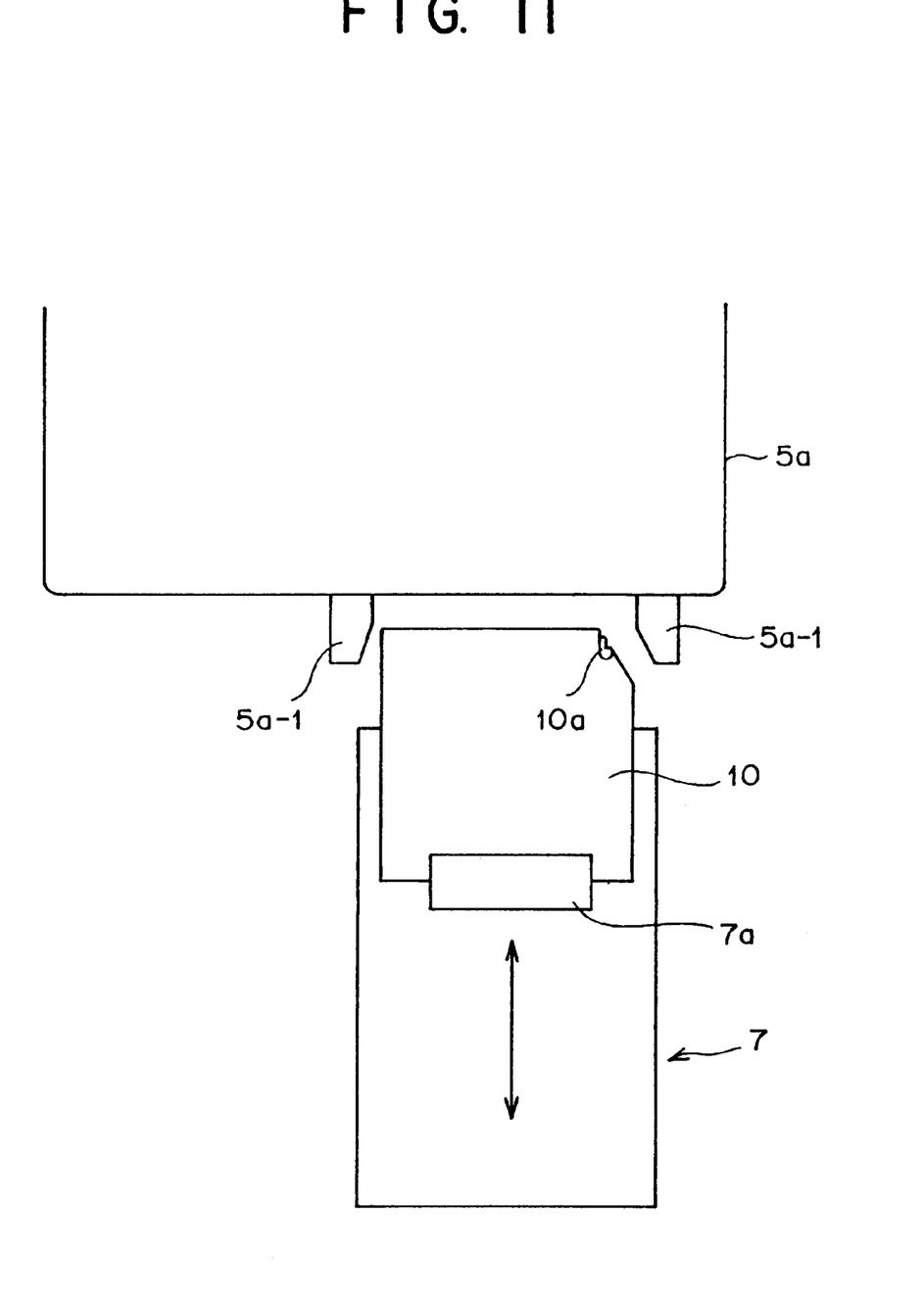
FIG. 11 is a plan view showing the state in which a hand mechanism normally holds a magnetic tape cartridge.

To ensure reliable entry/exit of the cartridge 10, a conventional library apparatus has been provided with a mechanism for delivery and reception of the cartridge. This mechanism is provided between the MTU 5a and the hand mechanism 7a in the accessor 7. Recently, however, in order to reduce the overall size of the library apparatus, it has been desirable to design a library apparatus which does not use this delivering and receiving mechanism. In such a configuration, the accessor 7 has been designed to directly insert the cartridge 10 into the MTU 5a as shown in FIGS. 11 and 12. Direct entry of the cartridge by the accessor into the MTU 5a makes a size-reduction of the hand mechanism 7a essential. Accordingly, not only the hand mechanism 7a but also the accessor 7 have undergone a size-reduction.

However, the size-reduction of the hand mechanism 7a reduces the contact area in which the hand mechanism 7a grasps the cartridge 10. This reduction may cause difficulty in grasping the cartridge 10. In particular, there is a possibility that the hand mechanism 7a may be unable to grasp the cartridge 10 in a correct posture, making it difficult to insert the cartridge 10 into the MTU 5a (see FIG. 11). Moreover, the cartridge will be judged defective if the hand mechanism 7a experiences difficulty in handling the cartridge; whereupon it will be transported to the pocket.

The present invention has been developed with a view to eliminating this problem, and it is therefore an object of this invention to provide a library apparatus with a simple and compact arrangement which is capable of immediately and forcibly discharging defective cartridges outside of the library apparatus.

SUMMARY OF THE INVENTION

The above listed objects are met or exceeded by the present library apparatus having a cartridge forced exit station for forcibly discharging a defective cartridge outside of the library apparatus. The cartridge forced exit station of the present invention includes a storage rack for receiving a defective cartridge through the transferring mechanism from the operating space side in the interior of the library apparatus and for storing the received cartridge. As a result, a defective cartridge can immediately be discharged to an isolated area for safe removal from the library apparatus without requiring the intervention of a skilled technician.

The cartridge forced exit station can further be provided with a door for covering an opening section which establishes direct communication between a cartridge storage space in the storage rack and the external space around the library apparatus.

The cartridge forced exit station can be constructed such that the storage rack and the door are formed integrally with each other. In this manner, opening the door simultaneously moves the rack, thereby inhibiting access to the operating space for the transferring mechanism. An operator may gain access to a defective cartridge in the storage rack by opening the door. However, the safety of the operator is ensured as the operator is prevented from gaining access to the operating space when the door is in the open condition.

Furthermore, the cartridge forced exit station can be provided with a door locking mechanism for inhibiting an opening operation of the door when a defective cartridge is not stored in the storage rack and for allowing the door opening operation when the defective cartridge is stored therein. In this case, the cartridge forced exit station can be provided with a detecting mechanism for detecting the open/closed condition of the door as well as detecting the presence of a defective cartridge stored in the storage rack.

Moreover, in the case that the cartridge accommodates a magnetic tape and has a leader block for pulling out the magnetic tape, the storage rack may have a recess section made to facilitate the passage of a cartridge whose leader block is not properly seated. dr

BRIEF DESCRIPTION OF THE DRAWINGS

A preferred embodiment of the present invention is described herein with reference to the drawings wherein.

Figure 2:
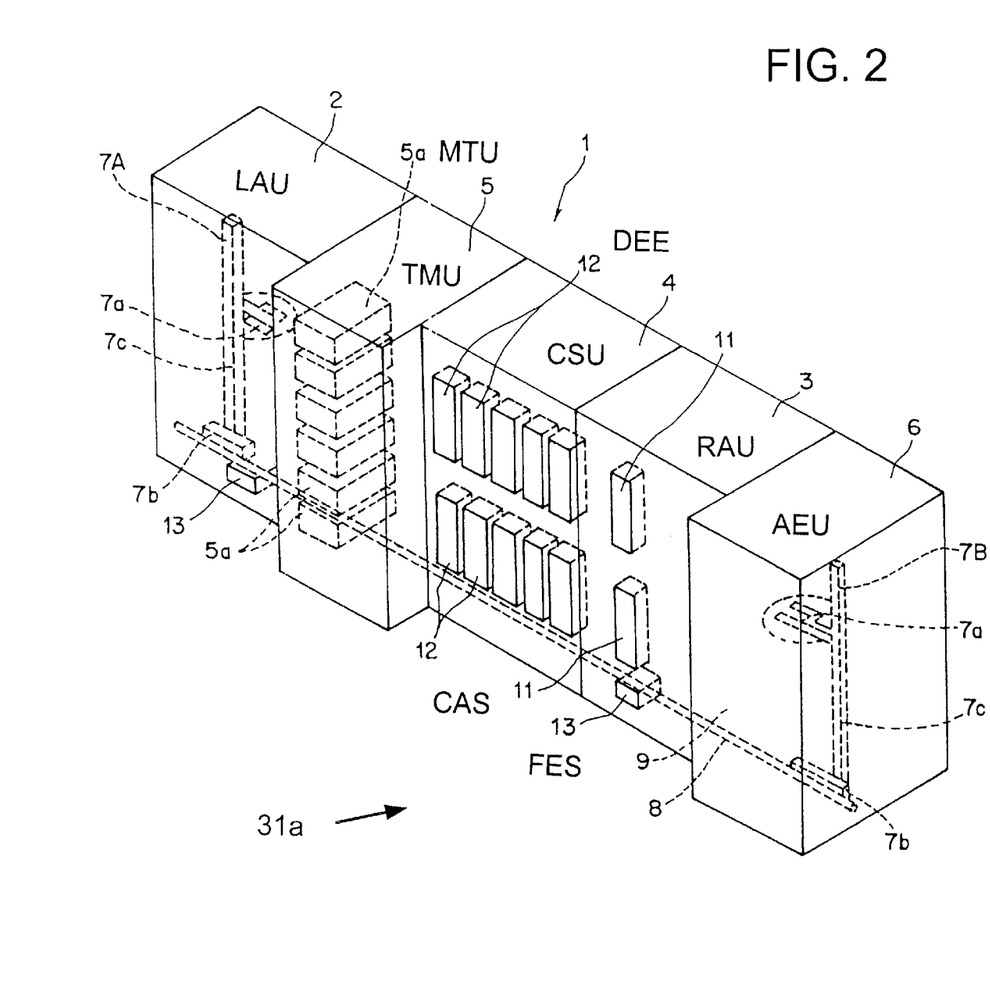
FIG. 2 is perspective view showing an arrangement of the library apparatus according to one embodiment.

DETAILED DESCRIPTION (1) Description of the Arrangement of a Library Apparatus Referring now to FIG. 2, the present library apparatus 1 is shown in perspective view. The library apparatus stores a large number of cartridges 10, such as magnetic tape cartridges (FIG. 10) and performs the recording/reproduction processing to/from each magnetic tape cartridge 10. The apparatus 1 includes left and right accessor units (LAU, RAU, respectively) 2, 3, a cartridge storage unit (CSU) 4, a tape drive mount unit (TMU) 5, and an accessor extend unit (AEU) 6, which are in a connected relation to each other. The apparatus 1 further includes accessor robots (accessors) 7A, 7B which transfer the cartridge 10 within a passage defined through the units 2 to 6.

The LAU 2 and RAU 3/AEU 6 function as garages for the accessors 7A, 7B, respectively. A pair of upper and lower cartridge entry/exit stations (CAS) 11 and a cartridge forced exit station (FES) 13 are provided on the front side of the RAU 3. The CAS perform the entry or exit of the cartridge 10 into or from the library apparatus 1, and the FES 13 discharges defective cartridges for removal from the library apparatus. In addition, another FES 13 is placed on the front side of the LAU 2. The present invention particularly relates to the FES 13, and a detailed structure thereof will be described later with reference to FIGS. 1 and 3 to 9.

According to one embodiment, the upper CAS 11 serves only for the entry of cartridges, while the lower CAS 11 acts for the exit of cartridges only. The upper and lower CAS each have the same structure.

The CSU 4 stores a large number of cartridges 10. According to one embodiment the CSU includes five car-tridge direct entry/exit stations (DEE) 12 on the upper side and five DEEs 12 on the lower side. In each DEE 12, a magazine (not shown) storing a plurality of cartridges 10 may be inserted, thereby facilitating the simultaneous entry or exit of a plurality of cartridges 10 into/from the library apparatus 1.

The TMU 5 has a plurality of MTUs 5a, each of which performs recording/reproduction of data onto/from a magnetic tape cartridge 10 or other device transferred by the accessor 7A or 7B.

The AEU 6 includes a power source (not shown) for supply of an operating power to the accessor 7A or 7B and a controller (not shown) for controlling the accessors.

The respective units 2 to 6 are in a coupled relation to each other, and are placed in a state where their respective rear surfaces are brought into contact with a wall surface or the like. Together they constitute the library apparatus 1. Further, formed in the library apparatus 1 is an operating space (accessor passage) 9 for the accessors 7A, 7B which penetrates the units 2 to 6. A rail 8 for guiding the respective accessors 7A, 7B is placed on the bottom surface of the operating space 9. Each of the accessors 7A, 7B has a hand mechanism 7a for holding the cartridge 10, a carriage 7b for allowing each accessor 7A or 7B to horizontally move along the rail 8, and a vertical column 7c for vertically guiding the hand mechanism 7a on this carriage 7b.

The cartridge(s) 10 are conveyed by the accessor 7A or 7B through the operating space 9, and are inserted/removed from the MTU 5a by the hand mechanism 7a.

A defective cartridge, e.g., a cartridge which is difficult to deal with, is placed in a storage rack 16 (see FIGS. 1 and 3 to 9) of the FES 13 by the accessor 7A or 7B. Accordingly, an operator may immediately remove the defective cartridge via the FES 13 without the need for intervention by a skilled technician.

(2) Description of a Cartridge Forced Exit Station (FES)

Figure 1:
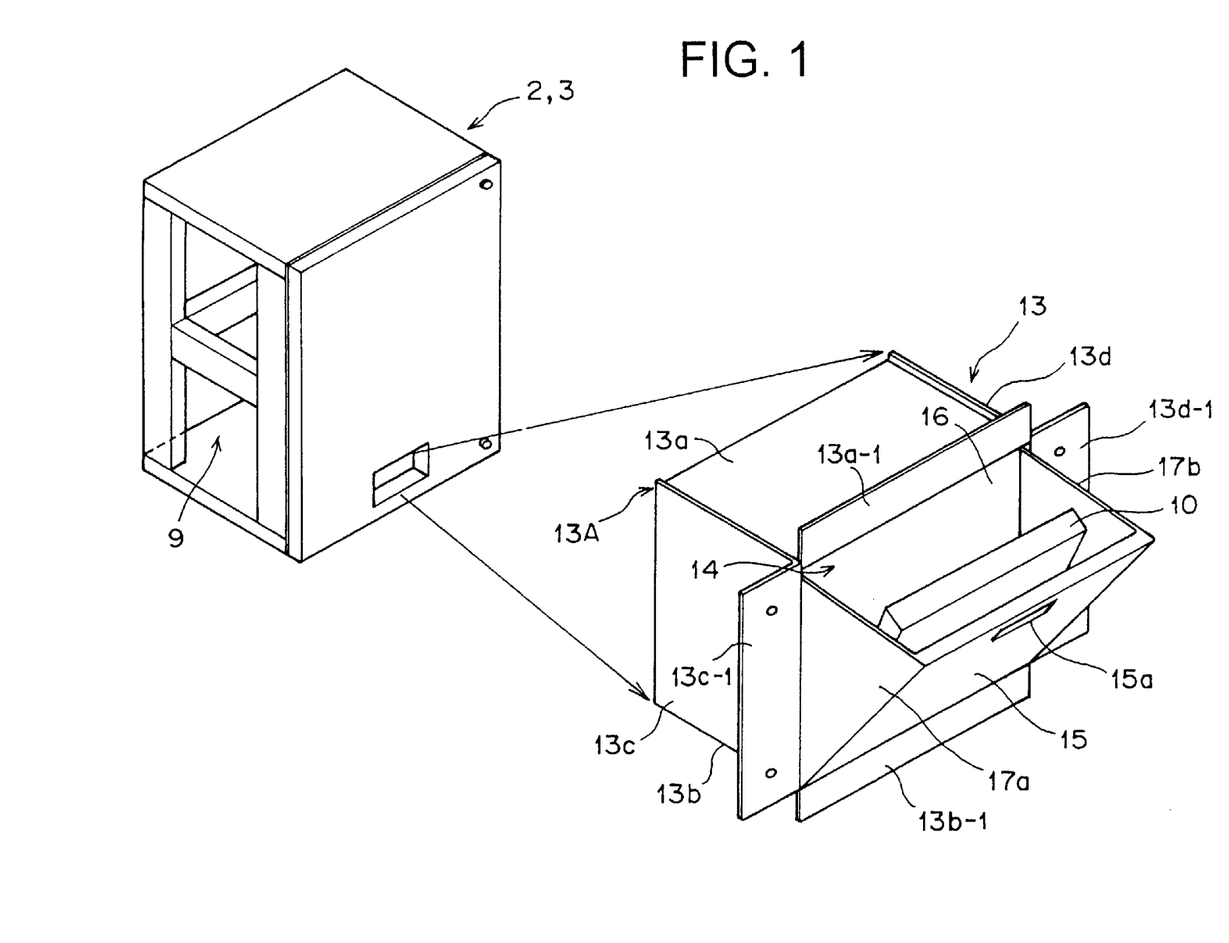
FIG. 1 is a perspective view showing an arrangement of a cartridge forced exit station (FES) of a library apparatus according to an embodiment of the present invention.

As shown in FIG. 1, the FES 13 is placed at a lower section of each of the LAU 2 and the RAU 3. In the embodiment shown, a top board 13a, a bottom board 13b and left and right side boards 13c, 13d collectively form a casing 13A.

The casing 13A is provided with a storage rack 16 for housing defective cartridges. In particular, a defective cartridge is inserted by the accessors 7A, 7B from the operating space 9 side. The casing 13A has an opening section 14 configured to establish communication and connection between a cartridge storage space in the storage rack 16 and an external space outside of the library apparatus 1 (LAU 2 or RAU 3). A door 15 is fitted to the casing to open/close this opening section 14 from the external space side (the operator side).

The door 15 and the storage rack 16 are integrally formed with each other through left and right side boards 17a, 17b, and cooperatively define an acute angle therebetween. The storage rack 16 is configured to be housed within the casing 13A so as to be downwardly inclined toward the external space side when the door 15 is in a closed condition. Further, a rotary supporting shaft 18 (FIGS. 4 and 6 to 9) is provided in the vicinity of the intersection between the door 15 and the storage rack 16 so that the door 15 and the storage rack 16 are rotatable together upon the rotary shaft 18.

The defective cartridge 10 in the storage rack 16 is exposed to the outside external space side when the door 15 is opened; while, concurrently, the storage rack 16 closes the opening section 14. The door 15 also serves as a stopper for determining the storing position of the defective cartridge 10O when storing the defective cartridge 10 in the storage rack 16. In addition, the door 15 has a knob 15a to facilitate opening and closing of the door 15 by the operator.

Each of the top board 13a, the bottom board 13b and left and right side boards 13c, 13d are respectively equipped with flanges 13a-1, 13b-1, 13c-1, 13d-1 formed toward the external space side. The respective flanges are used in fitting the FES 13 to the LAU 2 or the RAU 3.

Referring now to FIGS. 3 to 9, a detailed description will be made of the arrangement of the FES 13 according to the present invention.

As shown in FIGS. 3 to 9, an operating space side opening section 19 is formed in the FES 13 providing communication between the operating space 9 and a cartridge storage space in the storage rack 16. The opening section 19 is equipped with a guide member 20. A top surface (cartridge guide surface) 20a of the guide member 20 is formed at a downward incline from the operating space 9 side to the storage rack 16 side in order to guide a defective cartridge 10 onto the storage rack 16.

Figure 8:
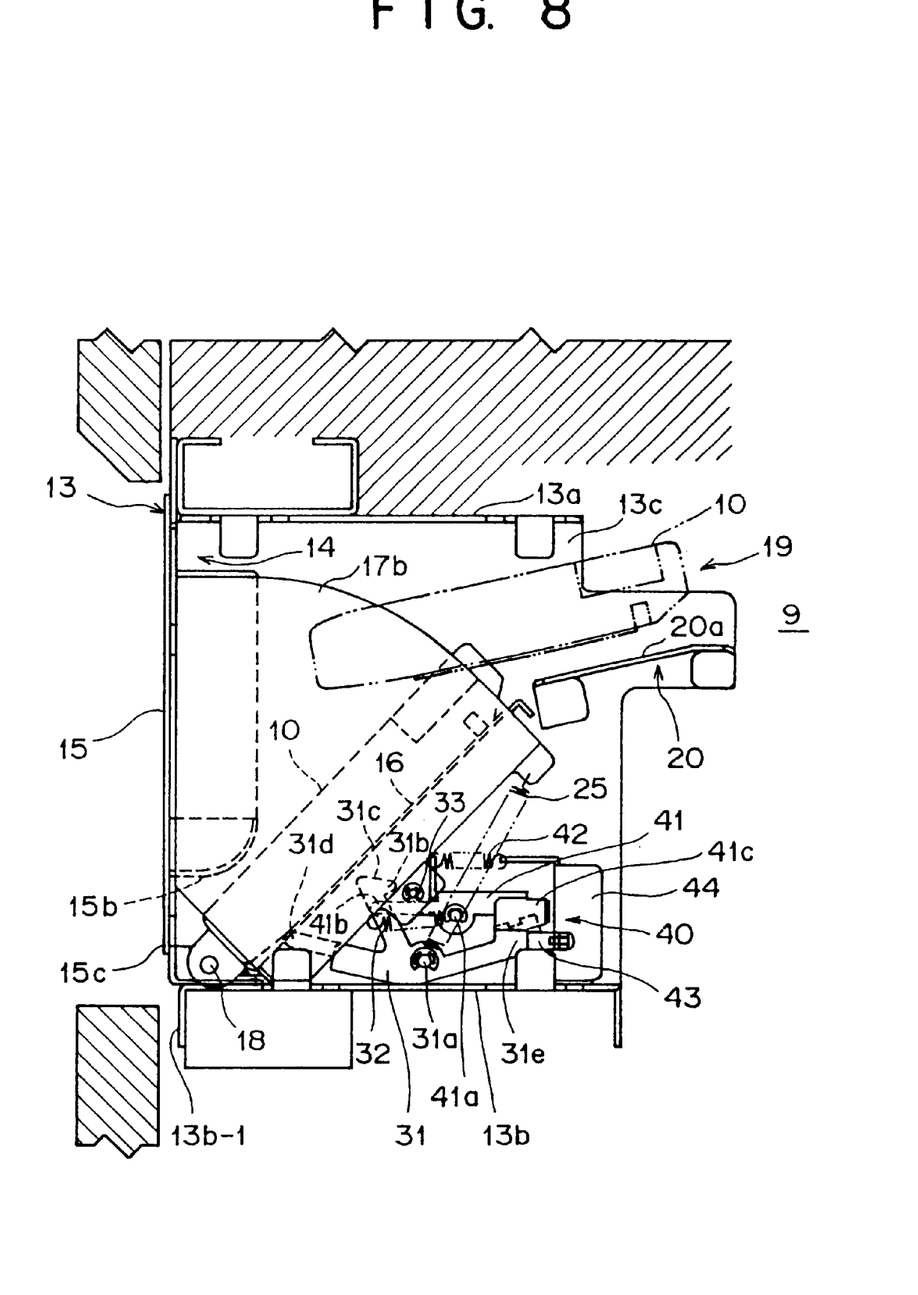
FIG. 8 is a side elevational view showing the FES, the door locking mechanism and the detecting mechanism in the door closed condition and the cartridge inserted condition, corresponding to FIG. 7.

A curved section 15b is formed in an inner and lower section of the door 15 in an opposed relation to the storage rack 16. The separation between the curved section 15b and the storage rack 16 is set to be slightly larger than the thickness of the defective cartridge 10. As shown in FIG. 8, the defective cartridge 10, inserted through the opening section 19, advances along the top surface of the storage rack 16 to be stored in between the curved section 15b and the storage rack 16.

Figure 9:
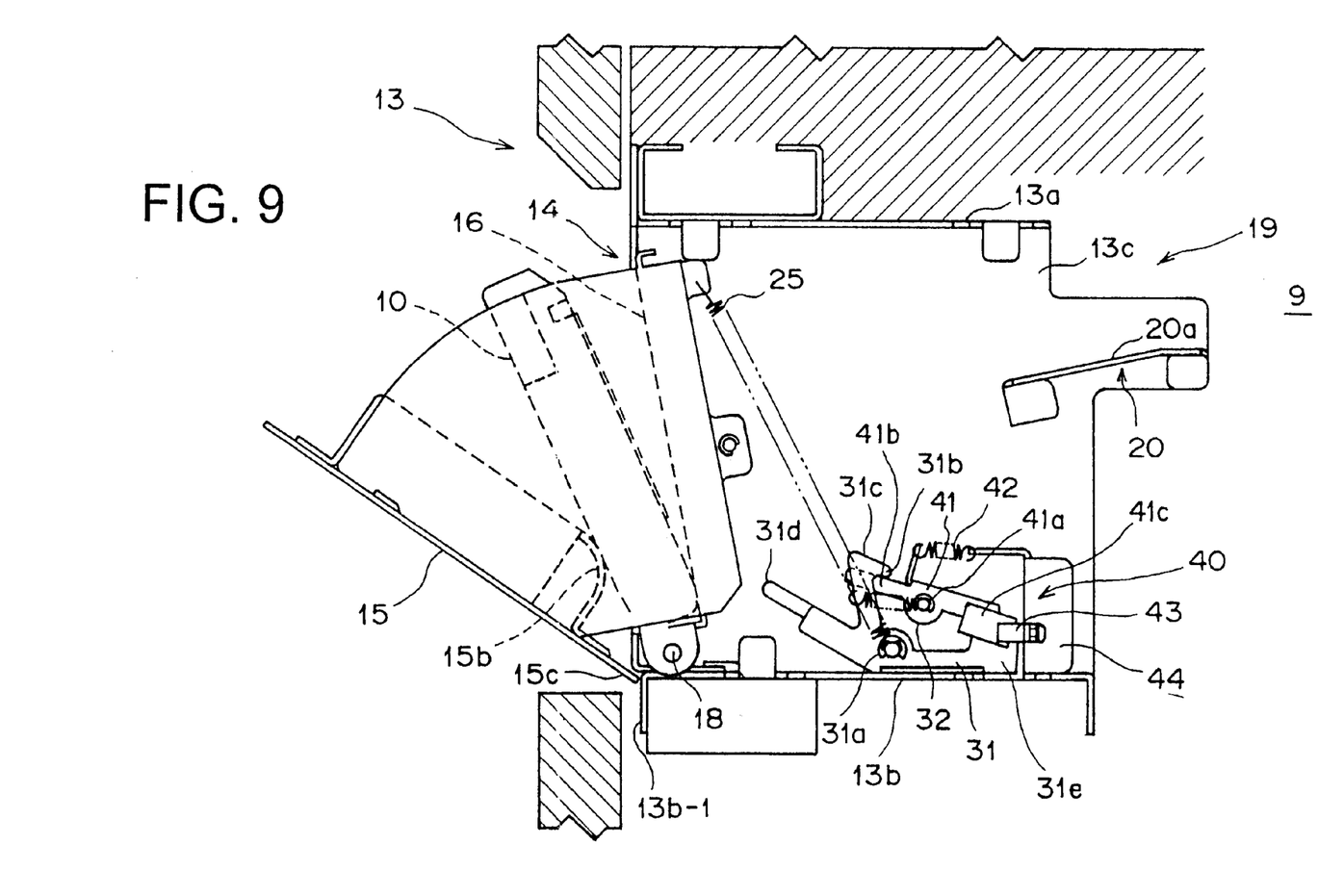
FIG. 9 is a side elevational view showing the FES, the door locking mechanism and the detecting mechanism in the door opened condition, corresponding to FIG. 7.

Still further, as the door 15 is rotated upon the rotary supporting shaft 18 to an open condition, the storage rack 16 shifts upward to a position slightly inclined from a vertical plane toward the external space side and closes the external space side opening section 14 (see FIG. 9). In the open condition, the defective cartridge 10 stored on the storage rack 16 is inclined to the door 15 side so as to contact the curved section 15b at a position where the operator can easily take out the defective cartridge 10.

Figure 6:
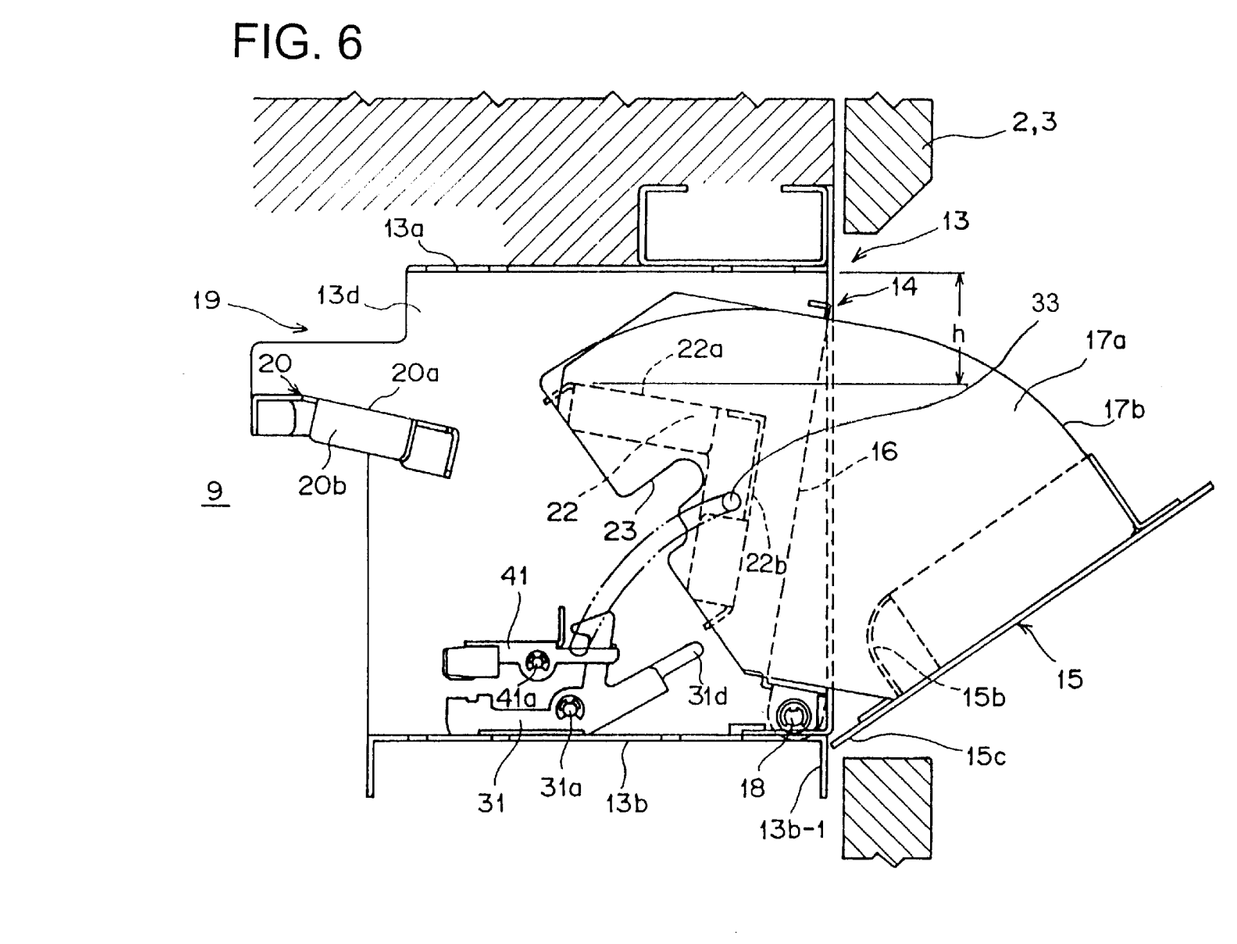
FIG. 6 is a side elevational view showing the FES in the door opened condition, corresponding to FIG. 4.

When the door 15 is open, a lower edge portion 15c of the door 15 is brought into contact with the flange 13b-1 of the bottom board 13b (see, FIGS. 6 and 9). Moreover, the contact between the door and the flange inhibits further rotation of the door 15 or the storage rack 16 toward the outside space side of the library apparatus.

Figure 7:
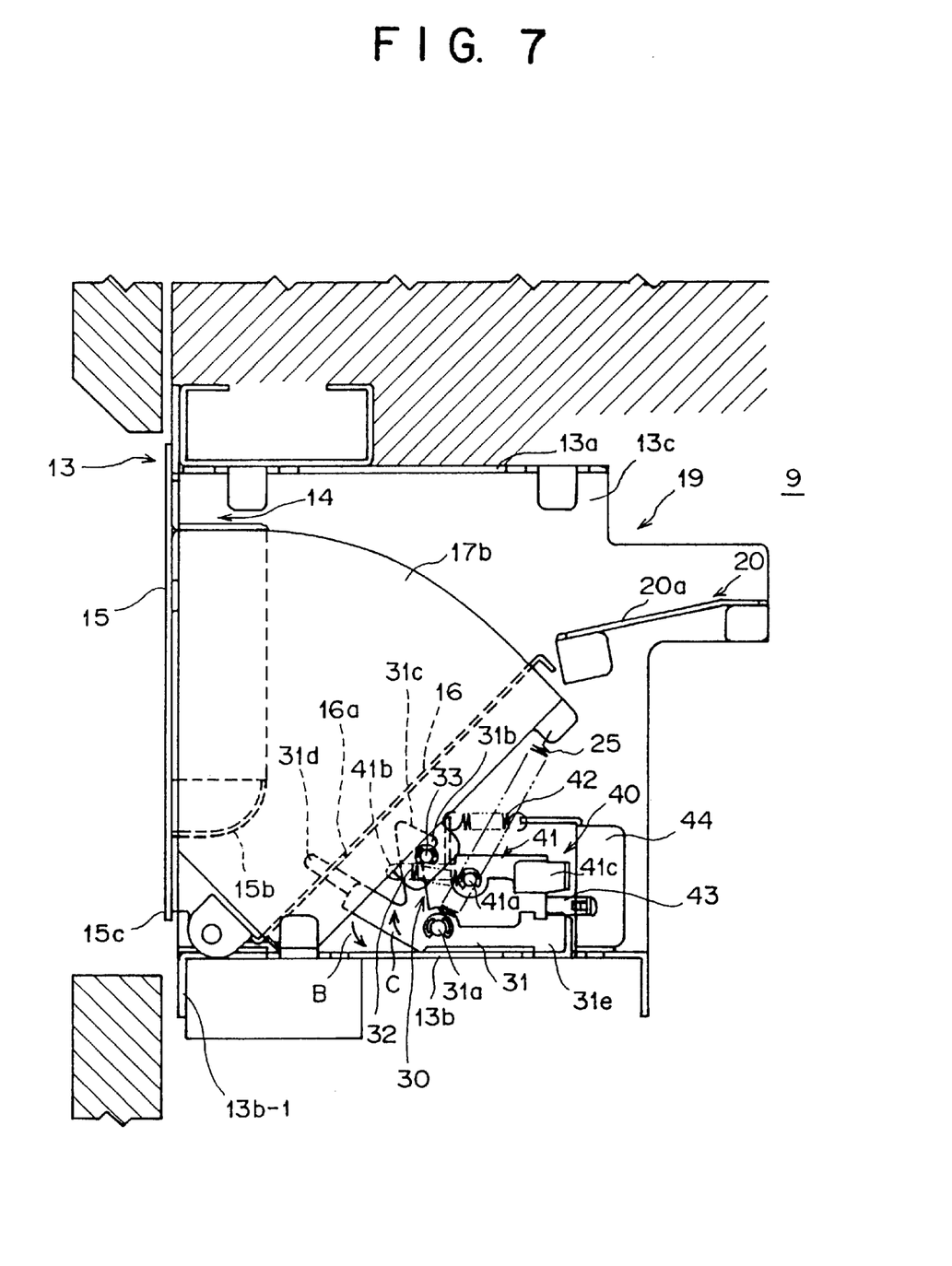
FIG. 7 is a side elevational view (a cross-sectional view taken along a line VII—VII of FIG. 3) showing the FES in the door closed condition, a door locking mechanism and a detecting mechanism.

As shown in FIGS. 7 to 9, the door 15 is biased in a closing direction by a spring 25 placed between an upper portion of the storage rack 16 and a rotary supporting shaft 31a of a lever 31. In opening the door 15, the operator must pull the door 15 against the biasing force of the spring 25. Thus, if the operator releases the door 15, it automatically closes under the biasing force of the spring 25.

Among the cartridges judged defective and stored in the storage rack 16 of the FES 13, are cartridges whose leader block 10a is improperly seated or altogether disengaged from the cartridge case. To facilitate ease of inserting and removing these cartridges, the FES is provided with a leader block passage (recess section) 21. Specifically, the FES is provided with a leader block guide member 22, adjacent to and lower in height than the storage rack 16 on the leader block 10a passing side. Moreover, the guide member 20 is notched at a portion through which the leader block 10a can pass, thereby creating the leader block passage 21 between the storage rack 16 and the left side board 17a.

The leader block guide member 22 is formed to have a pointed configuration (FIG. 4), and it has a guide surface 22a perpendicular to the top surface of the storage rack 16 on the operating space 9 side. The leader block guide member 22 also has a guide surface 22b parallel to the top surface of the storage rack 16 on the external space side. As indicated by an arrow A in FIG. 4, a misseated leader block is guided by the leader block passage from the operating space 9 side to the storage space side in the storage rack 16. Further, the guide member 20 has a guide surface 20b formed to guide the leader block 10a toward the interior of the leader block passage 21.

When the door 15 is in the open condition, the guide member 22 is positioned as shown in FIG. 6. Although the greater part of the external space side opening section 14 is closed by the storage rack 16, the left-hand portion of the opening section 14 remains open. However, since the separation h between the top board 13a and the guide surface 22a of the guide member 22 is extremely small as shown in FIG. 6, the operator's hands or the like can not enter the operating space 9 through the opening sections 14, 19, thus protecting the operator.

Furthermore, a recess section 23 (FIGs. 4, 6) is formed below the storage rack 16 and the guide member 22. Notably, the rotary supporting shaft 31a of the lever 31 and a rotary supporting shaft 41a of a lever 41 are fitted in the recess portion 23 when the door 15 is in the closed condition.

Still further, a locking shaft 33, constituting the door locking mechanism 30 is fixedly secured to the rear surfaces of the storage rack 16 and the guide member 22 (FIGS. 6 to 9). A moving locus of the locking shaft 33, taken in accordance with the opening and closing operations of the door 15, is indicated in FIG. 6 by a two-dot chain line.

Figure 3:
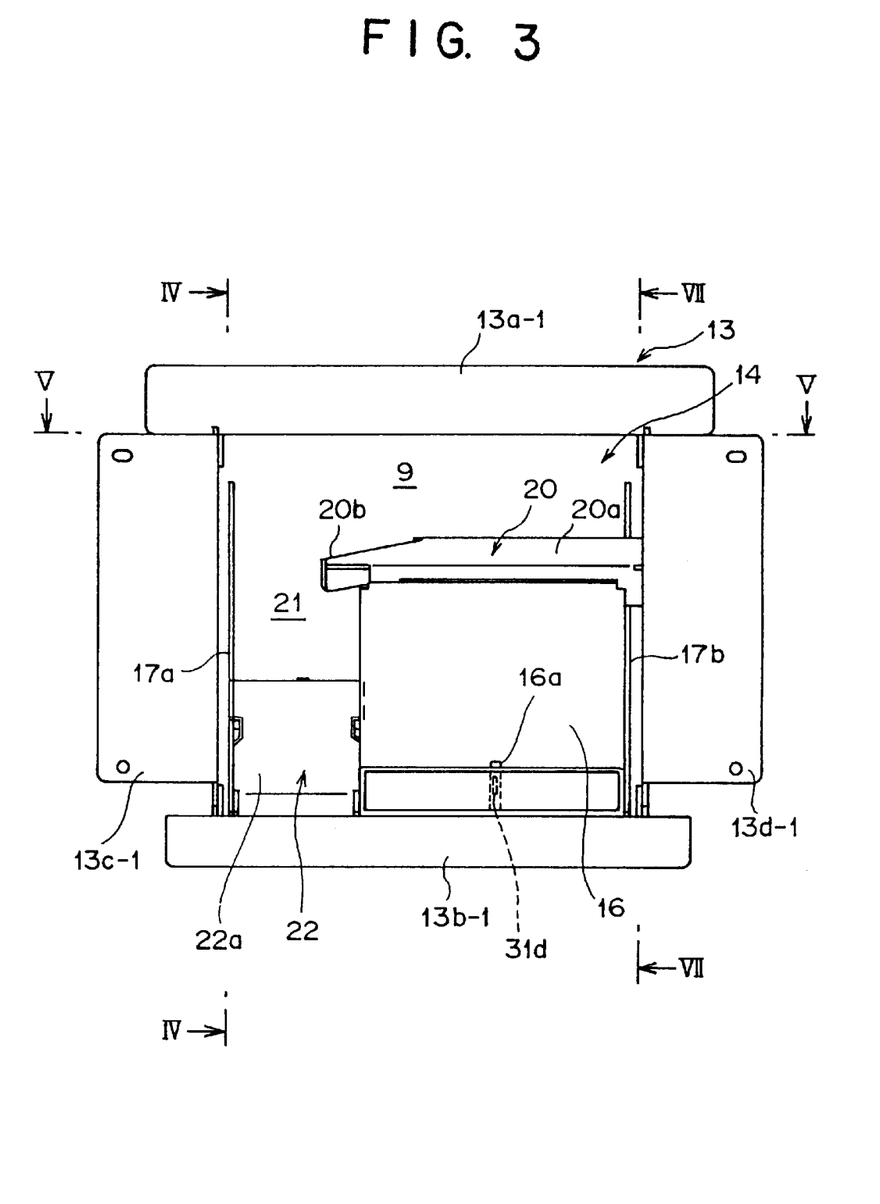
FIG. 3 is a front elevational view showing the FES in the door closed condition, where the door is omitted.
Figure 4:
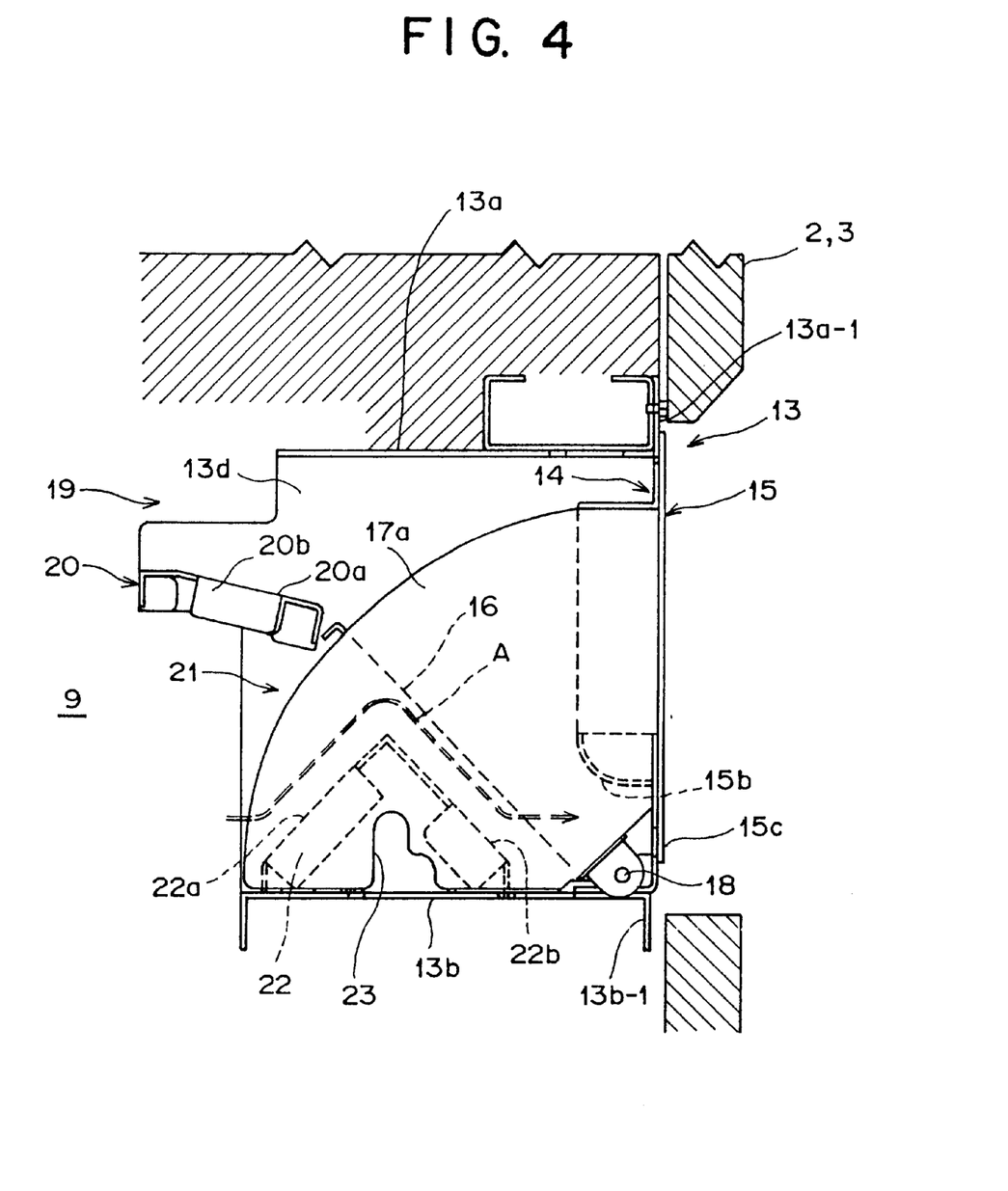
FIG. 4 is a side elevational view (a cross-sectional view taken along a line IV—IV of FIG. 3) showing the FES in the door closed condition.
Figure 5:
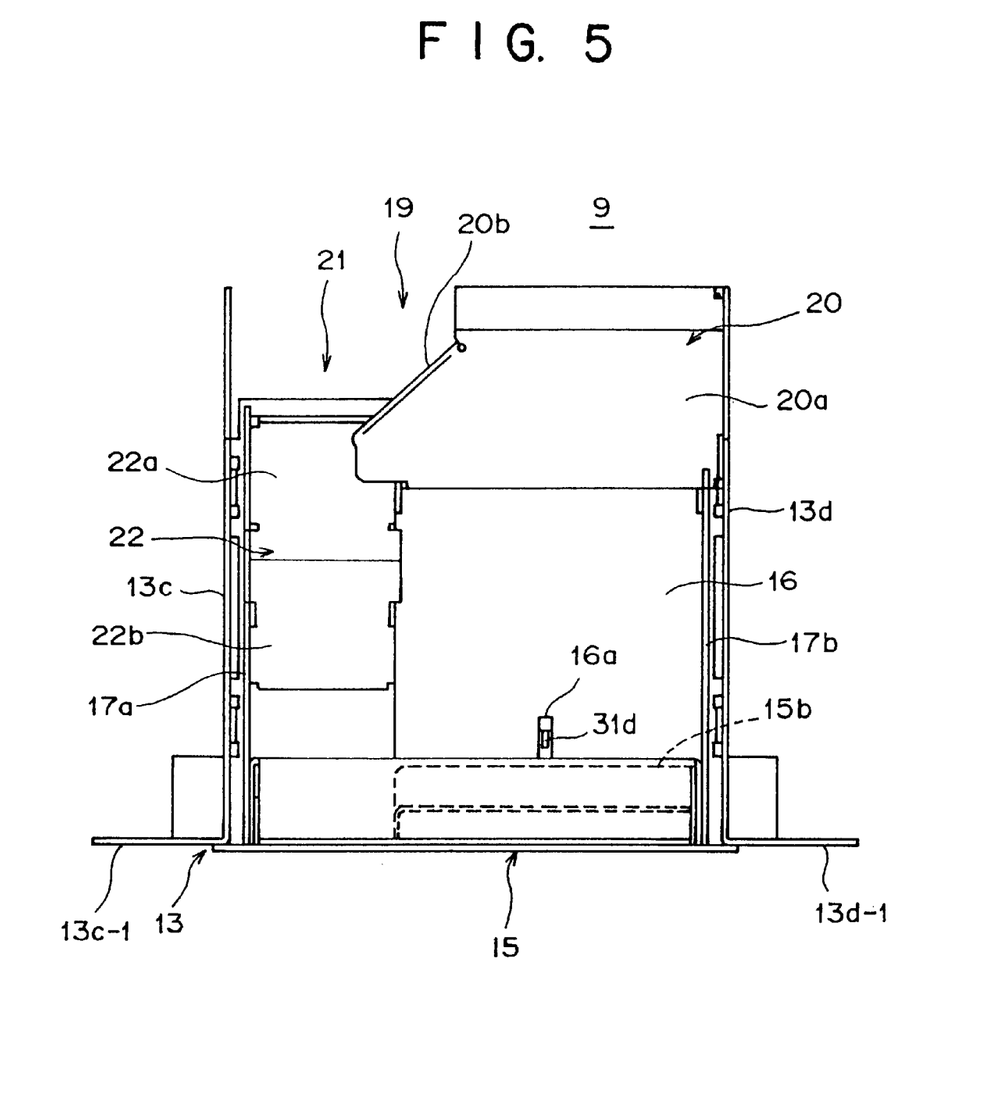
FIG. 5 is a plan view (a cross-sectional view taken along a line V—V of FIG. 3) showing the FES in the door closed condition.

Moreover, as shown in FIGS. 6 to 9, on the bottom board 13b below the storage rack 16 and the guide member 22, there are placed levers 31, 41, a sensor 43 and others which cooperatively define the door locking mechanism 30 and the detecting mechanism 40. In addition, the storage rack 16 has a slit 16a formed as shown in FIGS. 3 and 5. A cartridge contact end portion 31d of the lever 31 can protrude from the rear surface side through this slit 16a toward the top surface side thereof.

With this arrangement, a defective cartridge 10 is placed in the opening section 19 from the operating space 9 side by the accessor 7A or 7B (FIG. 8) and is inserted on the storage rack 16 while being guided by the guide surface 20a of the guide member 20.

As previously described, the FES of the present invention includes a safety feature wherein the opening section 14 is closed by the storage rack whenever the door is open to gain access to a defective cartridge. This safety feature prevents the operator from inserting a hand or the like into the operating space 9 when the door 15 is in the open condition. In addition, the FES is provided with a door locking mechanism 30 which allows the door 15 to take its open condition only when a defective cartridge 10 is in the storage rack 16. This enhances safety by preventing the door 15 from being opened inadvertently.

The door locking mechanism 30 inhibits (locks) the opening operation of the door 15 when a cartridge is not stored in the storage rack 16 while allowing the opening operation of the door 15 when a cartridge is stored in the storage rack 16. As shown in FIGS. 7 to 9, the door locking mechanism 30 is made up of the locking shaft 33 fixedly secured to the rear surface side of the storage rack 16, the door locking/cartridge detecting lever 31 and a spring 32.

The door locking/cartridge detecting lever 31 is fitted to a plate (not shown) or the like on the bottom board 13b to be rotatable upon the rotary supporting shaft 31a. The lever 31 has three end portions and the rotary supporting shaft 31a is substantially at a central portion among the three end portions. The first end portion is a hook end portion 31b for hooking the locking shaft 33 when the door 15 is in the closed condition (see, FIG. 7). The second portion of the lever 31 is a cartridge contact end portion 31d which is configured to come into contact with the bottom surface of the defective cartridge 10 when the door 15 is in the closed and locked condition. Finally, the third portion of the lever 31 is a sensor blocking end portion 31e for actuating the detecting mechanism 40.

The lever 31 is biased by the spring 32 in a hooking direction of the hook end portion 31b, causing the end portion to hook the locking shaft 33. In addition, when a cartridge is placed onto the storage rack 16 as shown in FIG. 8, the bottom surface of the defective cartridge 10 presses the cartridge contact end portion 31d of the lever 31. This causes the lever 31 to rotationally move in the direction of arrow B against the biasing force of the spring 32, releasing the hook end portion 31b from engagement with the locking shaft 33 (the closed and locked state of the door 15).

A tapered portion 31c is formed on the top surface of the hook end portion 31b. The tapered portion 31c is brought into contact with the locking shaft 33 when the door 15 is closed (see the locus of the locking shaft 33 indicated by a two-dot chain line in FIG. 6). When the tapered portion 31c and the locking shaft 33 take the contacting relation, the lever 31 first rotationally shifts in the direction shown by arrow B, against the biasing force of the spring 32. However, after the locking shaft 33 runs over the top portion of the hook end portion 31b, it rotationally shifts in the direction shown by arrow C. This in turn causes the hook end portion 31b to engage with the locking shaft 33, locking the door 15 in the closed condition.

With the above-mentioned arrangement of the door locking mechanism 30, the locking shaft 33 is hooked by the hook end portion 31b of the lever 31 when the door 15 is in the closed condition and no cartridge is housed on the storage rack 16 (FIG. 7). Accordingly, even if a person tries to open the door 15 by force, the opening of the door 15 is impeded.

When a defective cartridge 10 is put on the storage rack 16, the cartridge contact end portion 31d of the lever 31 is pressed by the bottom surface of the defective cartridge 10 (FIG. 8). Moreover, the lever 31 is rotated in a direction of the arrow B against the biasing force of the spring 32, thereby releasing the hook end portion 31b from engagement with the locking shaft 33. Whereupon, as shown in FIG. 9, the door 15 may be opened to remove the cartridge from the FES 13.

In the past, to prevent operator injury, a passage such as the operating space 9 side opening section 19 would be configured with a sufficiently small dimension to prevent an operator from inserting a hand or the like. However, as previously described, the door locking mechanisms of the present invention already ensure operator safety. Accordingly, the dimension of the operating space 9 side opening section 19 may be configured larger to assure entry of a cartridge onto the storage rack 16 even if the cartridge is inserted in an inclined condition.

In order to prevent the jamming of cartridges within the storage rack 16, the accessor 7A or 7B is controlled to only enter cartridges into the FES 13 when no cartridge is housed in the storage rack 16. Accordingly, it is necessary to detect the entry of cartridges into the FES 13 to control the operations of the accessors 7A, 7B. In particular, the detecting mechanism 40 is provided in order to detect the entry timing and is designed to operate in connection with the door locking mechanism 30.

The detecting mechanism 40 includes the door locking/cartridge detecting lever 31, a door open condition detecting lever 41 provided on the bottom board 13b, a spring 42, and an optical sensor 43. The door open condition detecting lever 41 is fitted to a plate (not shown) or the like on the bottom board 13b to be rotatable upon a rotary supporting shaft 41a. This lever 41 has both front and rear end portions with the rotary supporting shaft 41a being substantially at a central portion therebetween, and both of the end portions are formed as a locking shaft contact end portion 41b and a sensor blocking end portion 41c, respectively.

The locking shaft contact end portion 41b is brought into contact with the locking shaft 33 from below when the door 15 is in the closed condition. The lever 41 is biased by the spring 42 in the direction of making the locking shaft contact end portion 41b come into contact with the locking shaft 33. The spring 42 is interposed between the lever 41 and a plate 44 perpendicularly fitted onto the bottom board 13b.

Furthermore, the sensor blocking end portion 41c is configured to intercept the reception of light transmitted by the light-emitting element of the optical sensor 43 to the light-receiving element when the door 15 is in the open condition (FIG. 9). Correspondingly, the sensor blocking end portion 41c is configured to allow the light-receiving element to receive light from the light-emitting element when the door 15 is in the closed condition (FIGS. 7, 8).

Still further, the sensor blocking end portion 31e of the door locking/cartridge detecting lever 31 allows the reception of light when no cartridge is stored in the storage rack 16. When a cartridge 10 is placed in the storage rack 16, the cartridge contact end portion 31d comes into contact with the bottom surface of the defective cartridge 10 to rotate the lever 31, with the result that the hook end portion 31b and the locking shaft 33 are released from the engagement and, at the same time, the sensor blocking end portion 31e comes to a position between the light-emitting and light-receiving elements of the optical sensor 43 for the interception (FIG. 8). Thus, the optical sensor 43 is alerted both to the presence of a cartridge within the rack, and the open condition of the door 15.

The detecting mechanism 40 makes it possible to detect the timing at which a defective cartridge 10 can be placed into the FES 13 so that the operations of the accessors 7A, 7B may be controlled in accordance with the detection. Accordingly, removal of the defective cartridge from the FES may be assuredly performed without the occurrence of malfunctions, e.g. inserting a defective cartridge when the door is in the open condition.

Moreover, two separate sensors are commonly required to detect the open condition of the door 15 and the presence of a cartridge 10 placed on the storage rack 16. However, according to the present invention, detection of both of these conditions is possible with only one optical sensor 43.

In operation, the cartridge forced exit station 13 discharges defective cartridges 10 to an isolated space for subsequent removal from the library apparatus 1. The storage rack 16 receives a defective cartridge 10 from an operating space 9 of the transferring mechanism within the library apparatus 1, and stores the cartridge 10 therein. The storage rack 16 is arranged to provide access to the storage rack 16 from the operating space 9, while isolating the storage rack 16 from the external space side. Likewise, the storage rack 16 is arranged to provide access to the storage rack 16 from the external space side while isolating the storage rack 16 from the operating space 9.

Although the above description of this embodiment has been made in the case of the library apparatus 1 where the LAU 2, RAU 3, CSU 4, TMU 5 and AEU 6 are in connecting relation to each other, the present invention is not limited to this arrangement, but includes any unit arrangement as long as the library apparatus is equipped with the FES, which can provide the same operation and effects as those in the above-described apparatus.

A preferred embodiment of the cartridge forced exit station of the present invention has been described herein. It is to be understood, of course, that changes and modifications may be made in the embodiment without departing from the true scope and spirit of the present invention as defined by the appended claims.

What is claimed is:

1. A cartridge forced exit station for use in a library apparatus that includes a storage unit for storing a number of cartridges, each accommodating a storage medium, a transferring mechanism for transferring the individual cartridges among the library apparatus, and a drive unit for performing a desired process on the storage medium in the individual cartridges, said cartridge forced exit station being operable solely to discharge a cartridge judged to be defective out of the library apparatus, said cartridge forced exit station comprising:

a storage rack for receiving the defective cartridge transferred by the transferring mechanism from an internal operating space of the library apparatus, within which space the transferring mechanism operates, and for storing the defective cartridge therein; and a door connected to said storage rack such that said door and storage rack are movable as a unit, said door being movably mounted in said cartridge forced exit station and in cooperation with said storage rack selectively providing (i) access to said storage rack from said internal operating space while isolating said storage rack from an external space of the library apparatus, and (ii) access to said storage rack from said external space of the library apparatus while isolating said storage rack from said internal operating space of the library apparatus.

2. A cartridge forced exit station as defined in claim 1, further comprising a door locking mechanism for preventing said door from opening unless the defective cartridge is located in said storage rack.

3. A cartridge forced exit station as defined in claim 2, further comprising a detecting mechanism, responsive to the locking of said door by said door locking mechanism, for detecting said door assuming in a fully closed posture and the absence of the defective cartridge in said storage rack.

4. A cartridge forced exit station as defined in claim 1, wherein said storage rack has a recess section configured to allow said storage rack to receive a magnetic tape cartridge having a disengaged leader block.

5. A library apparatus comprising:

a storage unit for storing a number of cartridges each accommodating a storage medium;

a drive unit for performing a desired process on the storage medium in the individual cartridges;

a transferring mechanism for transferring the individual cartridges; and a cartridge forced exit station for discharging a possible defective cartridge, among the number of cartridges, out of said library apparatus for removal of the defective cartridge by a user, said cartridge forced exit station including:

a storage rack for receiving the defective cartridge transferred by said transferring mechanism from an internal operating space of said library apparatus, within which space said transferring mechanism operates, and for storing the defective cartridge therein; and a door connected to said rack such that said door and said storage rack are movable as a unit, said door being movably mounted in said cartridge forced exit station, said door in combination with said storage rack selectively providing (i) access to said storage rack from said internal operating space of said library apparatus while isolating said storage rack from an external space of said library apparatus, and (ii) access to said storage rack from said external space of said library apparatus while isolating said storage rack from said internal operating space of said library apparatus.

6. A library apparatus as defined in claim 5, wherein said cartridge forced exit station further comprises a door locking mechanism for preventing said door from opening unless a cartridge is located in said storage rack.

7. A library apparatus as defined in claim 6, wherein said cartridge forced exit station further comprising a detecting mechanism, responsive to the locking of said door by said door locking mechanism, for detecting said door assuming in a fully closed posture and the absence of the defective cartridge.

8. A library apparatus as defined in claim 5, wherein said storage rack has a recess section configured to allow said storage rack to receive a magnetic tape cartridge having a disengaged leader block.

* * * * *